(12) United States Patent
Iwamoto

(10) Patent No.: US 6,172,854 B1
(45) Date of Patent: Jan. 9, 2001

(54) DISK DRIVE SUSPENSION WITH JUMPER LEAD SEGMENTS

(75) Inventor: Alejandro Koji Iwamoto, Temecula, CA (US)

(73) Assignee: Magnecomp Corp., Temecula, CA (US)

( * ) Notice: Under 35 U.S.C. 154(b), the term of this patent shall be extended for 0 days.

(21) Appl. No.: 09/535,449

(22) Filed: Mar. 24, 2000

Related U.S. Application Data

(63) Continuation-in-part of application No. 09/304,242, filed on May 3, 1999, which is a continuation-in-part of application No. 08/897,660, filed on Jul. 21, 1997, now Pat. No. 5,901,016.
(60) Provisional application No. 60/162,422, filed on Oct. 28, 1999.

(51) Int. Cl.[7] ............................................. G11B 5/48
(52) U.S. Cl. ............................................. 360/245.9
(58) Field of Search ................................. 360/245.8, 245.9, 360/246

(56) References Cited

U.S. PATENT DOCUMENTS

| 5,812,344 | * | 9/1998 | Balakrishnan | 360/104 |
| 5,883,758 | * | 3/1999 | Bennin et al. | 360/104 |
| 5,903,413 | * | 5/1999 | Brooks, Jr. et al. | 360/106 |
| 5,986,853 | * | 11/1999 | Simmons et al. | 360/104 |
| 6,046,886 | * | 4/2000 | Himes et al. | 360/104 |
| 6,057,986 | * | 5/2000 | Takasugi | 360/104 |

* cited by examiner

Primary Examiner—Jefferson Evans
(74) Attorney, Agent, or Firm—Louis J. Bachand

(57) ABSTRACT

A low manufacturing cost electrical connector for a disk drive suspension comprises lower cost, metal layer-free first flexible conductive laminate segment to connect to signal circuitry, a more expensive metal layer containing flexible conductive laminate second segment to connect to a slider, and a lower cost, easily variously shaped jumper segment supported on the actuator arm and coupled between said first and second segments to connect the slider to the signal circuitry in a manufacturing cost efficient way.

7 Claims, 4 Drawing Sheets

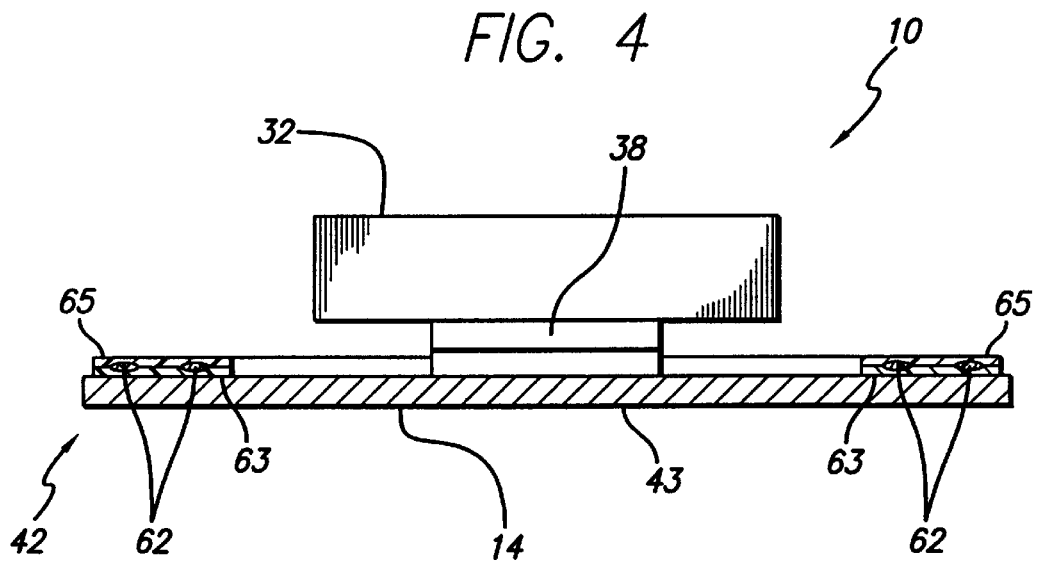
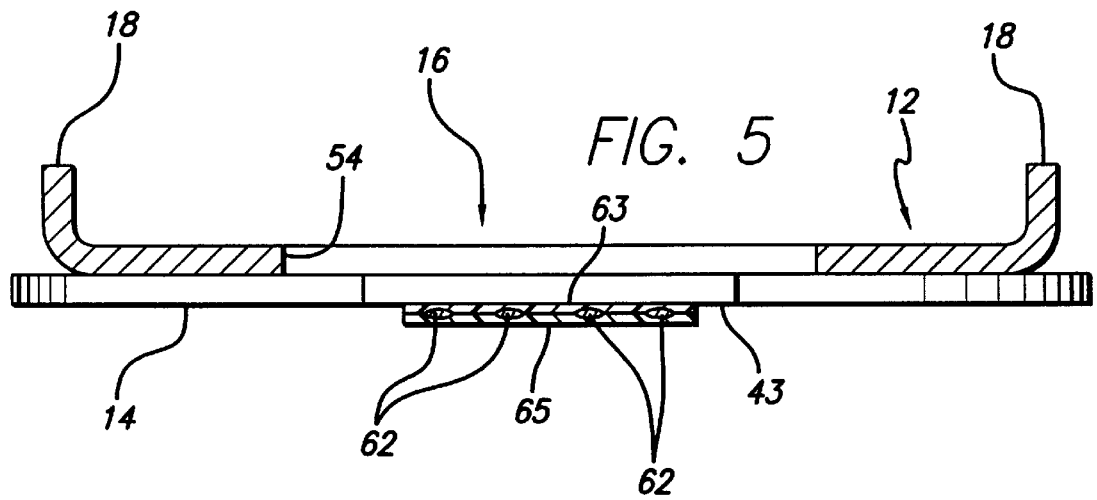

DISK DRIVE SUSPENSION WITH JUMPER LEAD SEGMENTS

CROSS-REFERENCE TO RELATED APPLICATIONS

This application is a continuation in part of my copending application Ser. No. 09/304242 filed May 3, 1999, which is in turn a continuation in part of application Ser. No. 08/897,660 filed Jul. 21, 1997, now U.S. Pat. No. 5,901,016 issued May 4, 1999 which claims benefit to provisional application 06/162422 filed Oct. 28, 1999.

Statement Regarding Federally Sponsored Research or Development

Not applicable.

Reference to a Microfiche Appendix

Not applicable.

BACKGROUND OF THE INVENTION

1. Field of the Invention

This invention has to do with disk drive suspensions, and more particularly with improvements in the design and structure of disk drive suspension electrical connectors that are used to carry current between a load beam-supported slider and suspension-associated signal circuitry. In a specific aspect, the invention provides a disk drive suspension in which the advantages of metal layer-free flexible conductive laminate segments, including lower cost and easier fabrication in various configurations to meet suspension design needs, are maximally obtained while retaining the benefits of a metal layer containing flexible conductive laminate segment from the load beam rigid portion forward.

2. Related Art

Signal circuitry has been electrically connected to the slider, including the recording head carried by the slider, by various types of electrical connectors including wire bundles and flexible circuitry exclusively or in combination with varying effectiveness and cost efficiencies. There is a considerable cost disparity between the available conductive laminates, the metal layer type conductive laminates being more expensive than the laminates of only trace conductors and an insulative film. Different suspension designs will require that the connector extending between the signal circuitry and the slider be configured differently, and take on unusual shapes in many instances. Configuring these shapes in the conductive laminate connector will often require much waste of material as the needed contours will not always nest or otherwise fall into an economical cutting pattern. In this case the added material costs of the metal layer laminate can be prohibitive. It is, however, often necessary to have the greater stiffness properties of the metal layer containing laminate at the slider or distal end of the suspension.

SUMMARY OF THE INVENTION

It is an object, therefore, of the invention to provide a disk drive suspension having electrical connectors that provide substantially the benefits of a flexible conductive circuit connection at lower cost and with easier fabrication. It is a further object to provide a hybrid of electrical connectors that avoid incurring the higher cost of the metal layer laminate over much of the length of the conductor and offer increased design freedom in the bulk of the conductor without unneeded added expense. A still further object is realized is to provide a suspension having the needed properties of the metal layer conductive laminate at the distal end where the slider is located, but not much beyond that end. Only lower cost, simple conductive trace and insulative layer laminate is used where the conductor must be specially configured with possible excessive waste of material. Other objects include retaining the manufacturing advantages of flexible conductive circuit, including ready automation of slider-to-flexure assembly and substantially bias-free attachment to the slider.

These and other objects of the invention to become apparent hereinafter are realized in a disk drive suspension comprising a load beam adapted to mount to an actuator arm of an actuator, the load beam having a distal rigid portion, and supported by the load beam a flexure for carrying a slider, an electrical connector running substantially the length of the actuator arm and the load beam to the slider, the connector comprising an electrically integrated hybrid of different segments including a first flexible conductive laminate segment free of a metal support layer and supported by the actuator and connected to signal circuitry, a second flexible conductive laminate segment including a metal support layer that is supported by the load beam and connected to the slider, and a third flexible conductive laminate jumper segment that is supported by the actuator arm and connected between the first and second segments, the segments being arranged sequentially and in such manner that the slider head is electrically coupled to the signal circuitry by the first flexible conductive laminate segment at the proximal end of the load beam, by the second flexible conductor laminate segment at the load beam distal rigid portion, and by the jumper segment between the first and second segments.

In this and like embodiments, typically, the first, second and jumper flexible conductive laminate segments each comprise at least one pair of conductive leads laminated with plastic film, the second segment further comprising a stainless steel layer laminated with the plastic film, and the second flexible conductive laminate segment is electrically connected to the slider substantially in slider movement bias free relation.

In a further embodiment, the invention provides a disk drive suspension comprising a load beam adapted to mount to an actuator arm extending from an actuator, the load beam having a distal rigid portion, and supported by the load beam a flexure carrying a slider, an electrical connector comprising an electrically integrated hybrid of different segments including a first flexible conductive laminate segment supported by the actuator and connected to signal circuitry, a second flexible conductive laminate segment including a metal support layer that is supported by the load beam and connected to the slider, and a third flexible conductive laminate jumper segment connected between the first and second segments and supported by the actuator arm along a major portion of the actuator arm length, the first segment and the jumper segment each comprising a two-component structure of copper conductors and plastic dielectric, and the second segment comprising copper conductors, plastic dielectric, and a stainless steel support laminated to the plastic dielectric, the conductors being joined at the proximate and distal ends of the jumper segment to define an continuous electrical path for carrying current from the slider head to signal circuitry beyond the actuator arm.

In this and like embodiments, typically, the first and second flexible conductive laminate segments are each free of junctions, the second and third flexible conductive laminates are respectively on opposite sides of said load beam, said load beam being apertured for interconnection of said second and third segments, or, the second and third flexible conductive laminates are each on the same side of said load beam, and the second flexible conductive laminate segment is electrically connected to the slider substantially in slider movement bias free relation.

In a further embodiment, the invention provides in combination: an actuator arm, a load beam and a slider, and the first, second and jumper flexible conductive laminate segments as above described, the segments being electrically coupled into a single electrical connector and arranged to conduct current from the slider to signal circuitry.

BRIEF DESCRIPTION OF THE DRAWINGS

The invention will be further described in conjunction with the attached drawings in which:

FIG. 4 is a view taken on line 4—4 in FIG. 2; and,

FIG. 5 is a view taken on line 5—5 in FIG. 3.

DETAILED DESCRIPTION OF THE INVENTION

Figure 1:
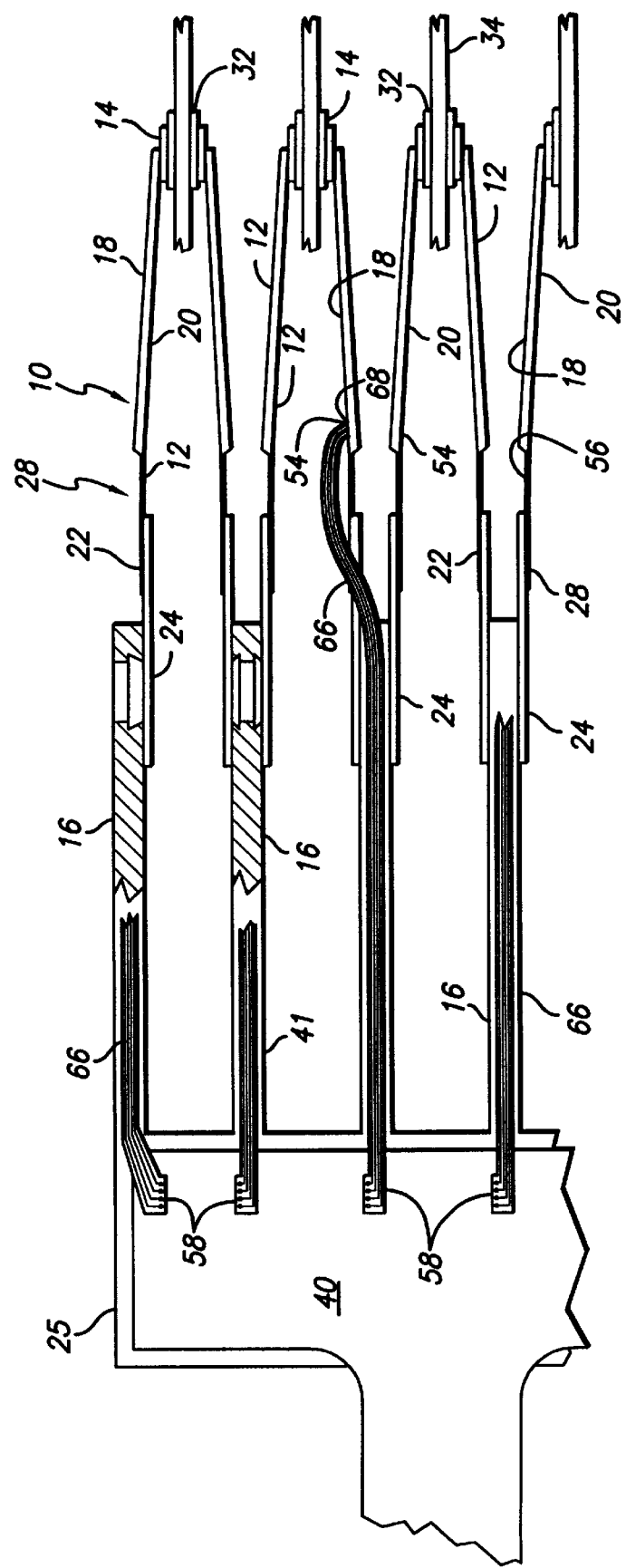
FIG. 1 is a side elevation view, partly schematic, of a head stack assembly of suspensions according to the invention.
Figure 2:
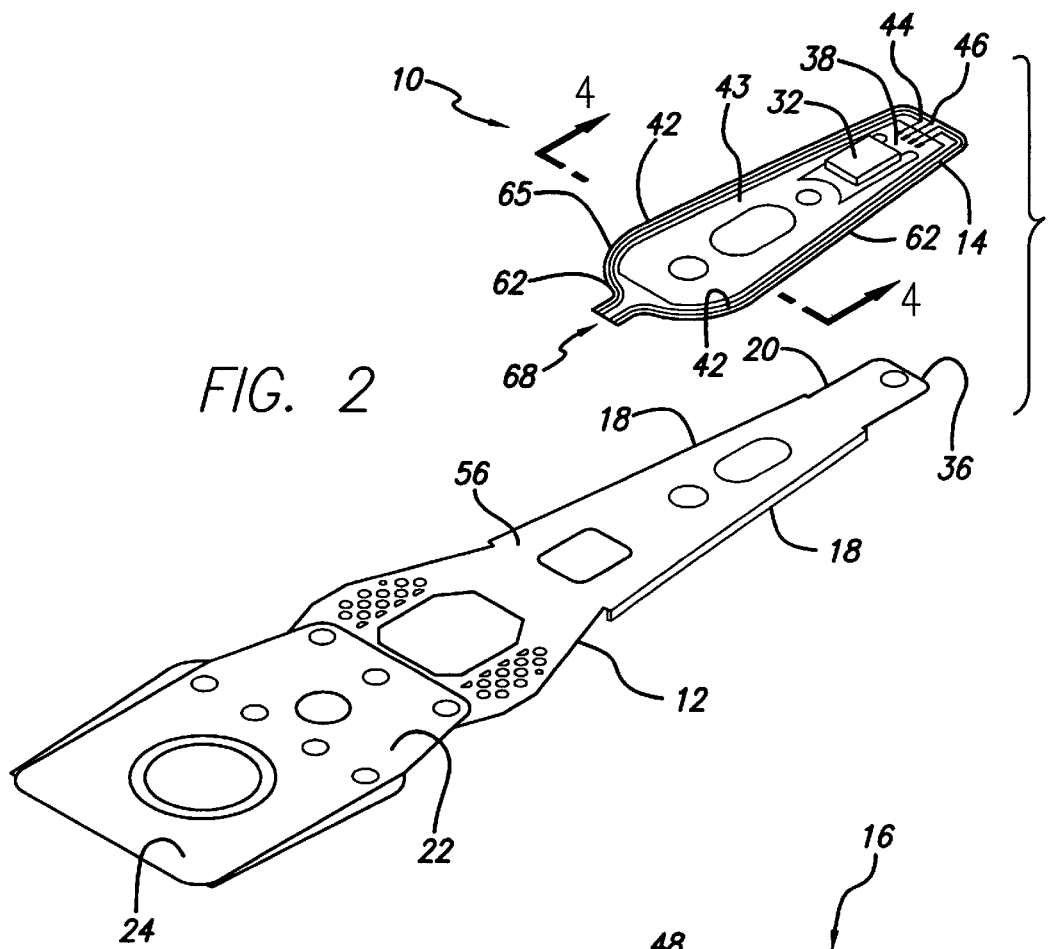
FIG. 2 is an oblique view of the invention suspension slider side up, the flexible conductive laminate segment being separated for clarity of illustration.
Figure 3:
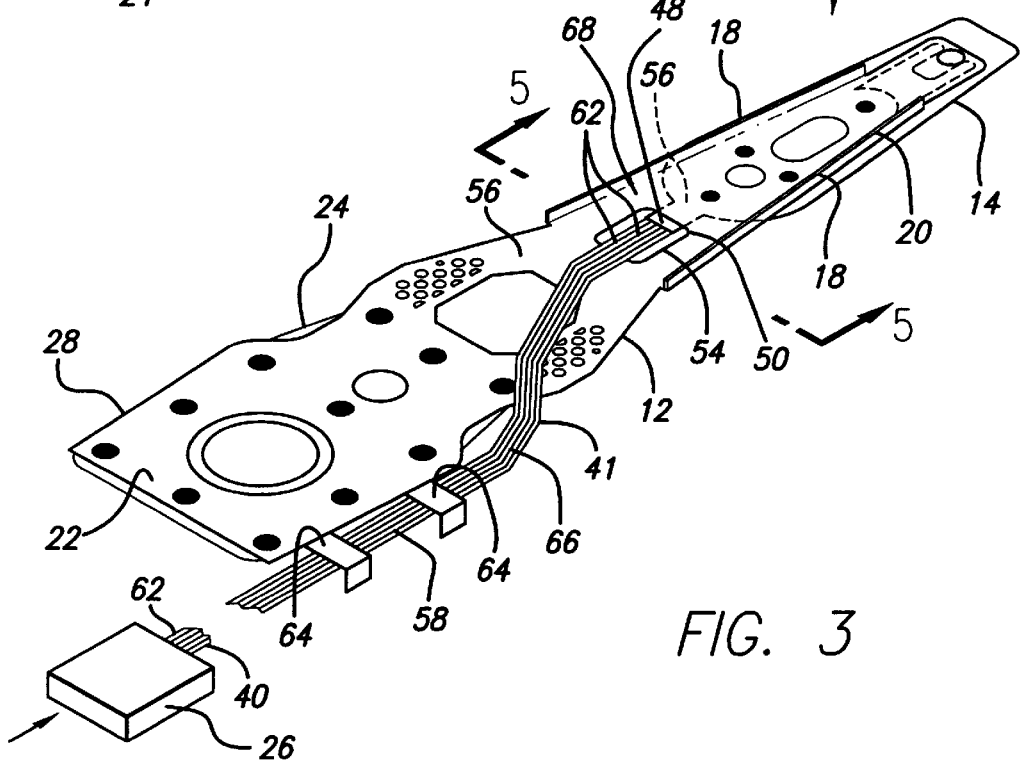
FIG. 3 is an oblique view of the invention suspension slider side down.

The present invention suspension utilizes a novel electrical connector in which the major portion of electrical connector, that portion that needs to be contoured the most to fit individual suspension requirements, comprises a jumper segment. The jumper segment is preferentially used where shaping of the connector dictates some waste of material. The jumper segment, being only a laminate of trace conductors and an insulative film is lower in cost that a metal layer containing conductive laminate. The jumper segment serves to connect first and second segments attached respectively to the device electronics at the proximate end of the suspension and the slider at the distal end of the suspension. The advantages of the invention include the possible reduction is material cost since the flexible circuit without a metal layer is relatively inexpensive in comparison with the metal layer-including laminate used here in relatively small amounts, just along the rigid portion of the load beam, and an absence of conductor bias at the slider/air bearing through the use of the laminate as opposed to more rigid materials such as wire.

In addition, the invention offers advantages in manufacturing. The proximate first segment is readily handled; the distal second segment of the flexible circuit and flexure when formed as a strip also can be handled with known manufacturing procedures, including placement and welding, and automation is feasible. The third or jumper segment is also readily handled, and there are relatively fewer junctions to be made and quality controlled. The product offers substantially the electrical performance of a wire bundle system.

With reference now to the drawing in detail, in FIGS. 1–5 a first embodiment of the invention disk drive suspension 10 comprises a load beam 12 and a flexure 14 mounted as shown in a stack of like suspensions supported by arms 16 of actuator 25. Load beam 12 is generally planar and locally flanged to have side rails 18 in its rigid distal portion 20. Load beam base portion 22 attaches to a mounting plate 24 that in turn mounts the load beam 12 to the actuator 25 via arm 16. Signal circuitry element 26 is located at the proximate end 28 of the load beam 12 for the purpose of sensing and transmitting signal exchanges through electrical connector 66 with the slider 32 carried on flexure 14 attached to the load beam distal end 36. Slider 32 defines an air bearing relative to the disk drive disk 34 and carries the electrical and magnetic portions of the head.

The load beam 12, flexure 14, slider 32 and signal circuitry element 26 shown are typical of suitable structures for their respective functions, with no particular form or design of load beam, flexure, slider or signal circuitry being critical to this invention.

The invention is concerned particularly with improvements in the design and form of the electrical connector 66 between the signal circuitry 26 and the slider 32. The freedom of movement of tongue 38 of the flexure 14, and rotation of the slider 32 in various axes, is critical to the optimum functioning of the suspension 10. It is nonetheless required to attach electrical connectors to the flexure and fine leads to the slider 32, without unduly affecting the movement freedom of these elements. In the present device, the connector 66 comprises an integrated hybrid of different segments namely first segment 40, second segment 42 and a third or jumper segment 41 interposed between the first and second segments between connections 58 (to the first segment, and 68 to the second segment. Electrical connector first segment 40 and third or jumper segment 41 are each comprised of a flexible conductive laminate typically comprising conductive traces 62, an insulative film 63 on which the traces are formed and a covering insulated film 65 as needed. First segment 40 is supported by the actuator arm 16 and is electrically coupled to the signal circuitry 26.

The second segment 42 comprises flexible conductive laminate like first segment 40, but also has a stainless steel layer 43, FIG. 4. Electrical connector second segment 42 is supported by the load beam rigid portion 20 and is electrically coupled to the slider 32. Second connector segment 42 thus comprises metal support layer 43, conductive traces 62, and plastic insulative film 65; it can function as the flexure 14 and its leads used to electrically couple to the slider 32. The flexible conductive laminate 42 segment is arranged to add no particular bias to flexure 32 movement. The use of flexible conductive laminate 42 as or with the flexure 14 enables automated attachment of the leads 44, 46 to the slider 32 as noted previously and is advantageous in the manufacturing process.

The third segment 41 as mentioned comprises flexible conductive laminate of traces 62 and film 63 like that of first segment 40, for lower cost, over the major portion of the electrical connector 66 for purposes explained above, particularly in allowing great freedom of routing the connector with various shapes being economically feasible. Third segment 41 serves to connect or jump between the first and second segments 40, 42 and is readily replaceable should the need arise by simply disconnecting at the junctions 58, 68. Thus, should damage occur to the jumper segment, it can be replaced without having to replace the entire head gimbal assembly or head stack assembly that might otherwise be required with a single electrical connector.

In addition to the configuration advantages noted above that use of a jumper segment 41 provides, there are benefits in manufacturing including absence of problematic long flex-wire leads on the jumper segment since this segment does not go to the device electronics. Also, the nature of the jumper segment can be varied to vary the electrical properties of the connector overall.

In the embodiment of FIGS. 1–5, the connector jumper segment 41 comprised of metal layer-free conductive laminate does not lie on the same side of the load beam 12 as the slider 32. Accordingly, the load beam is apertured at 54 just beyond the proximal end 56 of the load beam rigid portion 20. The leads 44, 46 from the flexible conductive laminate second segment 42 are gathered at the rigid portion proximal end 56 and are there accessible through aperture 54 of the load beam 12 for connection to the distal ends of leads 48, 50 of third flexible conductive laminate 41. The connector first flexible conductive laminate segment 40 extends to the junction 58 where it is joined to the third segment 41. Third segment 41 then extends along the arm 16 and the load beam 12 length (to and through the aperture 54 as needed) for connection to the conductive leads 44, 46 of the second segment 42 flexible conductive laminate to form the complete electrical connector 66 running the length of the load beam and electrically interconnecting slider 32 and signal circuitry element 26.

Figure 6:
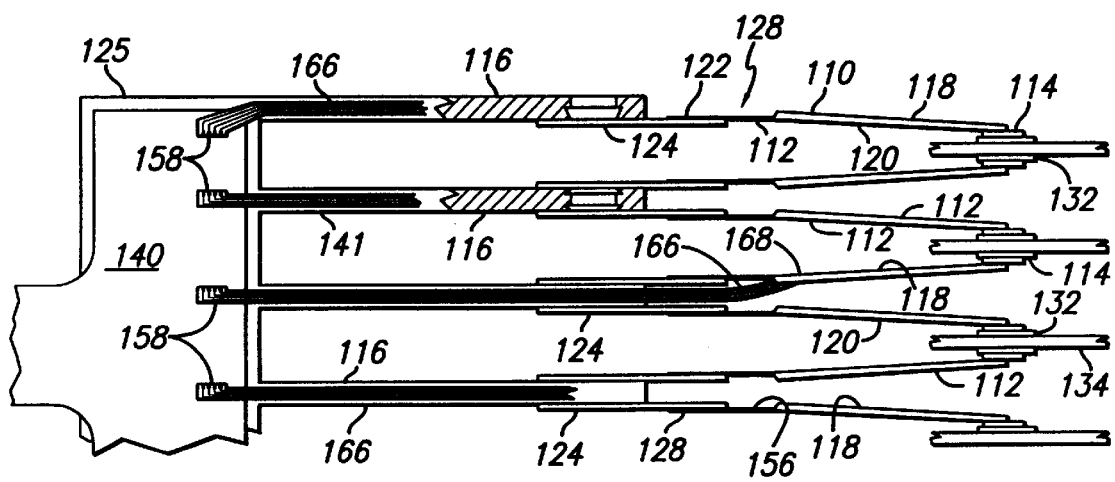
FIG. 6 is a view like FIG. 1 of an alternative embodiment.
Figure 7:
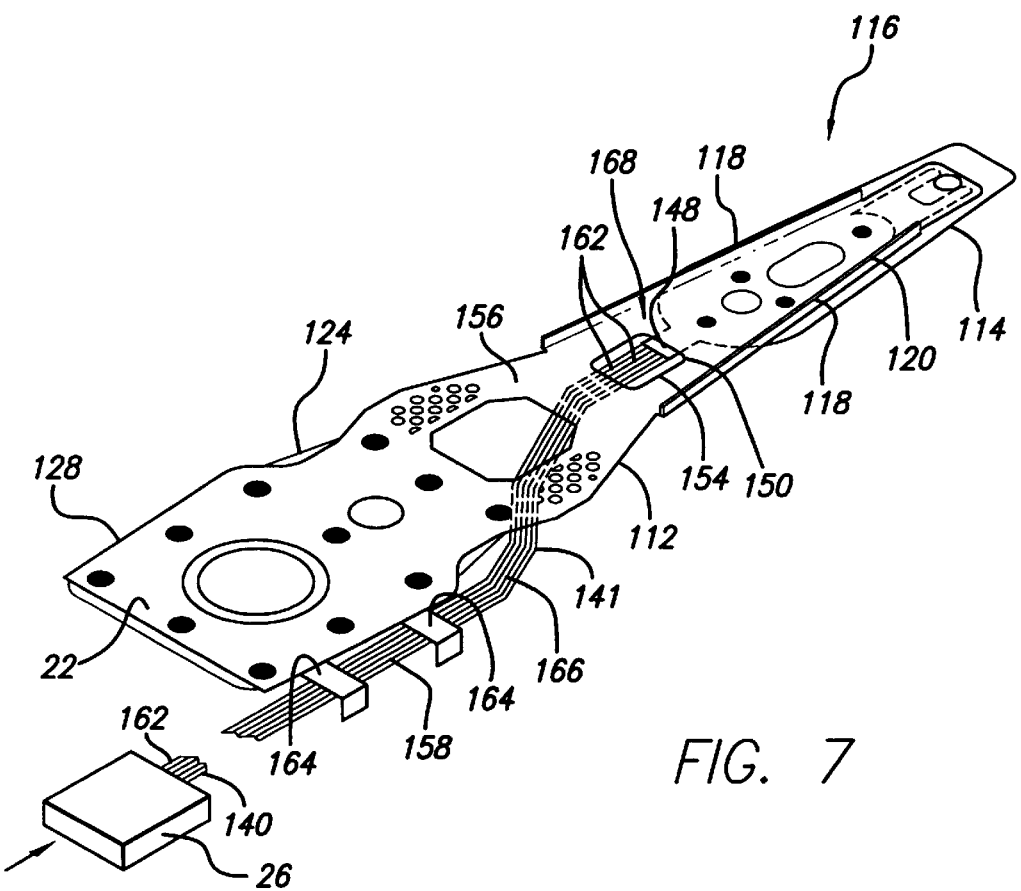
FIG. 7 is a view like FIG. 3 of the alternative embodiment.

With reference to FIGS. 6 and 7, an alternate embodiment in which like parts have like numbers plus 100, the connector jumper segment 141 comprised of metal layer-free conductive laminate lies on the same side of the load beam 112 as the slider 132, that is below the load beam in the Figure, as shown by the segment being in dashed lines when below the load beam. Thus, while the load beam 112 is still shown apertured at 154 just beyond the proximal end 156 of the load beam rigid portion 120, such aperture is not necessary as the segment 141 is on the same side as the second segment 142 and its slider 132. The leads 144, 146 from the flexible conductive laminate second segment 142 are gathered at the rigid portion proximal end 156 for connection to the distal ends of leads 148, 150 of third flexible conductive laminate 141. The connector first flexible conductive laminate segment 140 extends to the junction 158 where it is joined to the third segment 141. Third segment 141 then extends along the arm 116 and the load beam 112 length for connection to the conductive leads 144,146 of the second segment 142 flexible conductive laminate to form the complete electrical connector 166 running the length of the load beam and electrically interconnecting slider 132 and signal circuitry element 126.

The invention thus provides a disk drive suspension having electrical connectors that provide substantially the benefits of a flexible conductive circuit connection at lower cost and with easier fabrication by using a hybrid of electrical connectors that avoid incurring the higher cost of the metal layer laminate over much of the length of the conductor and offer increased design freedom in the bulk of the conductor without unneeded added expense. A suspension is provided having the needed properties of the metal layer conductive laminate at the distal end where the slider is located, but not much beyond that end. Only lower cost, simple conductive trace and insulative layer laminate is used where the conductor must be specially configured with possible excessive waste of material while retaining the manufacturing advantages of flexible conductive circuit, including ready automation of slider-to-flexure assembly and substantially bias-free attachment to the slider. The foregoing objects of the invention are thus met.

I claim:

1. A disk drive suspension comprising a load beam adapted to mount to an actuator arm extending from an actuator, said load beam having an aperture and a distal rigid portion, and supported by said load beam a flexure for carrying a slider, an electrical connector running substantially the length of said actuator arm and said load beam to said slider, said connector comprising an electrically integrated hybrid of different segments including a first flexible conductive laminate segment free of a metal support layer and supported by said actuator and connected to signal circuitry, a second flexible conductive laminate segment including a metal support layer that is supported by said load beam and connected to said slider, and a third flexible conductive laminate jumper segment that is supported by said actuator arm and connected between said first and second segments, said segments being arranged sequentially and in such manner that the slider head is electrically coupled to the signal circuitry by said first flexible conductive laminate segment at the proximal end of said load beam, by said second flexible conductor laminate segment at said load beam distal rigid portion, and by said jumper segment between said first and second segments, said second and third segments being respectively on opposite its sides of said load beam and connected to each other through said load beam aperture.

2. The disk drive suspension according to claim 1, in which said first, second and jumper flexible conductive laminate segments each comprise at least one pair of conductive leads laminated with plastic film, said second segment further comprising a stainless steel layer laminated with said plastic film.

3. The disk drive suspension according to claim 1, in which said second flexible conductive laminate segment is electrically connected to the slider substantially in slider movement bias free relation.

4. A disk drive suspension comprising a load beam adapted to mount to an actuator arm extending from an actuator, said load beam having a distal rigid portion, and supported by said load beam a flexure carrying a slider, an electrical connector comprising an electrically integrated hybrid of different segments including a first flexible conductive laminate segment supported by said actuator and connected to signal circuitry, a second flexible conductive laminate segment including a metal support layer that is supported by said load beam and connected to said slider, and a third flexible conductive laminate jumper segment connected between said first and second segments and supported by said actuator arm along a major portion of said actuator arm length, said first segment and said jumper segment each comprising a two-component structure of copper conductors and plastic dielectric, and said second segment comprising copper conductors, plastic dielectric, and a stainless steel support laminated to said plastic dielectric, said second and third flexible conductive laminates being reactivating on opposite sides of said load beam, said load beam being aperture for interconnection of said second and third segments, said conductors being joined at the proximate and distal ends of said jumper segment to define a continuous electrical path for carrying current from said slider head to signal circuitry beyond said actuator arm.

5. The disk drive suspension according to claim 4, in which said first and second flexible conductive laminate segments are each free of junctions.

6. The disk drive suspension according to claim 4, in which said second flexible conductive laminate segment is electrically connected to said slider substantially in slider movement bias free relation.

7. In combination: an actuator arm, a load beam and a slider, and the first, second and jumper flexible conductive laminate segments according to claim 4, said segments being electrically coupled into a single electrical connector and arranged to conduct current from said slider to signal circuitry.

\* \* \* \* \*